United States Patent
Kim et al.

(10) Patent No.: US 11,661,975 B2
(45) Date of Patent: May 30, 2023

(54) POWER TRANSMISSION APPARATUS AND POWER GENERATION SYSTEM HAVING SAME

(71) Applicant: DOOSAN ENERBILITY CO., LTD., Changwon-si (KR)

(72) Inventors: Yeong Chun Kim, Changwon (KR); Sang Sup Han, Daejeon (KR)

(73) Assignee: DOOSAN ENERBNLITY CO., LTD., Changwon (KR)

(*) Notice: Subject to any disclaimer, the term of this patent is extended or adjusted under 35 U.S.C. 154(b) by 0 days.

(21) Appl. No.: 17/141,105

(22) Filed: Jan. 4, 2021

(65) Prior Publication Data

US 2021/0254509 A1 Aug. 19, 2021

(30) Foreign Application Priority Data

Feb. 13, 2020 (KR) .................. 10-2020-0017624

(51) Int. Cl.
  *F16D 11/04* (2006.01)
  *F01D 5/02* (2006.01)
  *F01D 21/04* (2006.01)

(52) U.S. Cl.
  CPC .............. *F16D 11/04* (2013.01); *F01D 5/026* (2013.01); *F01D 21/045* (2013.01)

(58) Field of Classification Search
  CPC ......... F01D 5/026; F01D 21/045; F16D 11/04
  See application file for complete search history.

(56) References Cited

U.S. PATENT DOCUMENTS

| | | | | |
|---|---|---|---|---|
| 700,868 A | * | 5/1902 | Wiblitzhauser | F16D 11/04 192/25 |
| 747,792 A | * | 12/1903 | Spahr | F16D 11/04 192/24 |
| 9,169,780 B2 | * | 10/2015 | Barnett | F02C 7/06 |
| 2020/0018181 A1 | * | 1/2020 | Brault | F01D 21/045 |

FOREIGN PATENT DOCUMENTS

| | | | | |
|---|---|---|---|---|
| DE | 3341141 A | * | 5/1985 | ........... F01D 21/045 |
| EP | 2644428 B1 | | 9/2014 | |
| EP | 3228917 A1 | * | 10/2017 | ........... F01D 21/045 |
| JP | 59141225 U | | 9/1984 | |
| JP | 2008057541 A | | 3/2008 | |
| JP | 2014145414 A | | 8/2014 | |
| WO | 2015068822 A1 | | 5/2015 | |

OTHER PUBLICATIONS

KR notice of Allowance.

* cited by examiner

*Primary Examiner* — Courtney D Heinle
*Assistant Examiner* — Ryan C Clark
(74) *Attorney, Agent, or Firm* — Harvest IP Law LLP (57) ABSTRACT

A power transmission apparatus for transmitting power generated by a power generation apparatus to a generator and a power generation system including the same are provided. The power transmission apparatus for transmitting power generated by the power generation apparatus to the generator may include a first disk part connected to one of the power generation apparatus and the generator, a second disk part connected to the other one of the power generation apparatus and the generator and disposed on a rear side of the first disk part, and a connection part configured to connect the first disk part and the second disk part and include a portion that decreases and then increases in diameter along a longitudinal direction.

18 Claims, 5 Drawing Sheets

POWER TRANSMISSION APPARATUS AND POWER GENERATION SYSTEM HAVING SAME

CROSS-REFERENCE TO RELATED APPLICATION

This application claims priority to Korean Patent Application No. 10-2020-0017624, filed on Feb. 13, 2020, the entire disclosure of which is incorporated herein by reference in its entirety.

BACKGROUND

1. Field

Apparatuses and methods consistent with exemplary embodiments relate to a power transmission apparatus and a power generation system including the same and more particularly, to a power transmission apparatus that transmits power generated by a power generation apparatus, such as a gas turbine or steam turbine, to a generator and a power generation system including the same.

2. Description of the Related Art

A power generation system is a facility for generating electricity. The power generation system includes a generator that generates electricity based on an electromagnetic induction principle, and a power generation unit that generates a driving force for driving the generator. Here, the power generation unit may include a gas turbine and a steam turbine. The gas turbine generates rotational force by compressing air introduced from the outside, combusting a mixture of the compressed air and fuel, and passing the generated combustion gas therethrough. The steam turbine generates rotational force by passing steam therethrough.

The generator and the power generation unit are connected by a shaft system. That is, the generator and the power generation unit are equipped with respective shafts in a center. As the shaft of the generator is connected to the shaft of the power generation unit, the rotational driving force generated by the power generation unit is transmitted to the shaft of the generator via the shaft of the power generation unit.

On the other hand, during the operation of the power generation system, an emergency situation such as a surge may occur in the power system. Surge refers to a phenomenon in which abnormal and sudden current flows through the power system due to lightning strikes or short circuits of wires. When a surge occurs during the operation of a generator, the generator is overloaded and does not generate electricity, and acts as a motor that consumes power by the surge. That is, when a surge occurs, the generator rotates the shaft to generate a torque, which is about 5 to 15 times larger than the torque generated when the generator rotates the shaft in a normal situation. Therefore, in a surge situation, there is a problem that a shaft system or other rotating parts constituting the power generation system are damaged.

In order to prevent damage to the shaft system due to torque caused by the surge, there is a method of scaling up the shaft system. In this case, it is possible to prevent the shaft system from being damaged in an emergency situation such as a surge, but there is a problem that the manufacturing process of a product becomes complicated due to the expansion of the shaft system, and the overall manufacturing cost increases. In addition, when the shaft system is enlarged, there is also a problem that the transmission efficiency of the power generated by the power generation apparatus decreases.

In addition to making the shaft system larger, there is a method using an active actuator. The active actuator receives real-time feedback of a current value of the power system and separates the shaft of the generator from the shaft of the power generation apparatus when a surge occurs in the power system. At this time, the active actuator has a reaction time of about 50 ms, which is a time that the shaft system of the power generation system rotates about 3 times. Therefore, even if an actuator is used, there is a problem that the shaft system cannot be fundamentally prevented from being destroyed.

SUMMARY

Aspects of one or more exemplary embodiments provide a power transmission apparatus capable of preventing damage to a power generation system even in an emergency situation of a power system, and a power generation system including the same.

Additional aspects will be set forth in part in the description which follows and, in part, will become apparent from the description, or may be learned by practice of the exemplary embodiments.

According to an aspect of an exemplary embodiment, there is provided a power transmission apparatus for transmitting power generated by a power generation apparatus to a generator, the power transmission apparatus including: a first disk part connected to one of the power generation apparatus and the generator; a second disk part connected to the other one of the power generation apparatus and the generator and disposed on a rear side of the first disk part; and a connection part configured to connect the first disk part and the second disk part and include a portion that decreases and then increases in diameter along a longitudinal direction.

According to an aspect of another exemplary embodiment, there is provided a power generation system including: a gas turbine including a compressor configured to compress air, a combustor configured to mix the compressed air from the compressor with fuel and to combust an air-fuel mixture, and a turbine configured to generate power for generating electric power with the combustion gas discharged from the combustor; a generator disposed on one side of the gas turbine to generate electricity using the power generated from the gas turbine; and a power transmission apparatus disposed between the gas turbine and the generator to transmit the power generated by the gas turbine to the generator, the power transmission apparatus including: a first disk part connected to one of the gas turbine and the generator; a second disk part connected to the other one of the gas turbine and the generator and disposed on a rear side of the first disk part; and a connection part configured to connect the first disk part and the second disk part and include a portion that decreases and then increases in diameter along a longitudinal direction.

According to an aspect of another exemplary embodiment, there is provided a power generation system including: a steam turbine including a boiler configured to receive water from outside and evaporate water into steam, and a turbine configured to generate power for generating electric power by flowing steam from the boiler; a generator disposed on one side of the steam turbine to generate electricity using the power generated by the steam turbine; and a power transmission apparatus disposed between the steam turbine and the generator to transmit the power generated by the steam turbine to the generator, the power transmission apparatus including: a first disk part connected to one of the steam turbine and the generator; a second disk part connected to the other one of the steam turbine and the generator and disposed on a rear side of the first disk part; and a connection part configured to connect the first disk part and the second disk part and include a portion that decreases and then increases in diameter along a longitudinal direction.

The connection part may include a recessed groove that is recessed radially inward from an outer circumferential surface.

The first disk part may include a first coupling disk and a first disk shaft coupled to a rear side of the first coupling disk, the second disk part may include a second coupling disk and a second disk shaft coupled to a front side of the second coupling disk, and the connection part may be connected to the first disk shaft and the second disk shaft between the first disk shaft and the second disk shaft.

The power transmission apparatus may further include a support part supporting the first disk part and the second disk part from a radially outward of the first disk part and the second disk part.

The support part may include a support body disposed on a radially outward of the first and second disk shafts, a first support member extending radially inward from an inner circumferential surface of the support body to support the first disk shaft, and a second support member extending radially inward from the inner circumferential surface of the support body and disposed a rear side of the first support member to support the second disk shaft.

The support part may be interposed between the first support member and the first disk shaft, and between the second support member and the second disk shaft, respectively, and may further include a backup bearing rotatably supporting the first disk shaft and the second disk shaft.

The second disk part may be rotatably installed with respect to the first disk part.

The first disk part may include a first coupling disk, a first disk shaft coupled to a rear side of the first coupling disk, a first disk base coupled to a rear side of the first disk shaft, and a first disk wall extending rearward from a radially outer end of the first disk base. The second disk part may include a second coupling disk, a second disk shaft coupled to a front side of the second coupling disk and disposed on a radially inward of the first disk wall, and a second disk base coupled to a front side of the second disk shaft and disposed to face the first disk base. The connection part may be disposed to penetrate through the first disk base and the second disk base.

The first disk part may further include a first disk protrusion protruding rearward from the first disk base, the second disk base may include a base groove into which the first disk protrusion is inserted into the front side, and the second disk part may further include a first backup bearing seated in the base groove and into which the first disk protrusion is inserted so that the first disk protrusion is rotatably supported.

The second disk part may further include a second backup bearing interposed between the first disk wall and the second disk base to rotatably support the second disk base.

The first disk part may further include a first disk support protrusion protruding rearward from the first disk base, and the first disk protrusion may protrude rearward from the first disk support protrusion and have a smaller diameter than the first disk support protrusion.

The second disk part may further include a second disk support protrusion protruding forward from the second disk base and disposed to face the first disk support protrusion, and the base groove may be formed on a radially inward of the second disk support protrusion.

The connection part may include a connection member formed to penetrate through the first and second disk bases in a front-rear direction and having a portion whose diameter decreases and then increases along a longitudinal direction.

The connection part may further include a pair of nut members coupled to both ends of the connection member protruding forward from the first disk base and rearward from the second disk base, respectively, and seated on a front surface of the first disk base and a rear surface of the second disk base, respectively.

The second disk support protrusion may be in contact with the first disk support protrusion.

The connection part may further include a pair of cover members covering the pair of nut members from an outside of the pair of nut members.

The connection member may include a recessed groove recessed radially inward from an outer circumferential surface thereof, and the connection part may further include a pair of locking members coupled to the connection member between the first disk base and the second disk base and spaced apart from each other in the front-rear direction so that the recessed groove is disposed therebetween, and the pair of locking members may be seated on a rear surface of the first disk base and a front surface of the second disk base, respectively.

The connection part may include a connection member formed to penetrate through the first and second disk bases in a front-rear direction and having a portion whose diameter decreases and then increases along a longitudinal direction, and the connection member may include a recessed groove recessed radially inward from an outer circumferential surface thereof, and a distance between the first disk support protrusion and the second disk support protrusion may be greater than a width of the recessed groove in the front-rear direction.

In the power transmission apparatus and the power generation system including the same according to one or more exemplary embodiments, when excessive torque is applied to any one of the first disk and the second disk in an emergency situation such as a power system surge, the connecting portion connecting the first and second disks is cut (or broken) at a portion that decreases and then increases in diameter, thereby preventing excessive torque acting on one of the first disk and the second disk from being transmitted to the other disk. Therefore, according to the exemplary embodiments, it is possible to prevent the shaft system of the power generation system from being damaged even in an emergency situation such as a power system surge.

BRIEF DESCRIPTION OF THE DRAWINGS

The above and other aspects will become more apparent from the following description of the exemplary embodiments with reference to the accompanying drawings, in which.

DETAILED DESCRIPTION

Various modifications may be made to the embodiments of the disclosure, and there may be various types of embodiments. Thus, specific embodiments will be illustrated in drawings, and embodiments will be described in detail in the description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in case it is determined that in describing the embodiments, detailed explanation of related known technologies may unnecessarily confuse the gist of the disclosure, the detailed explanation will be omitted.

Hereinbelow, exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

Figure 1:
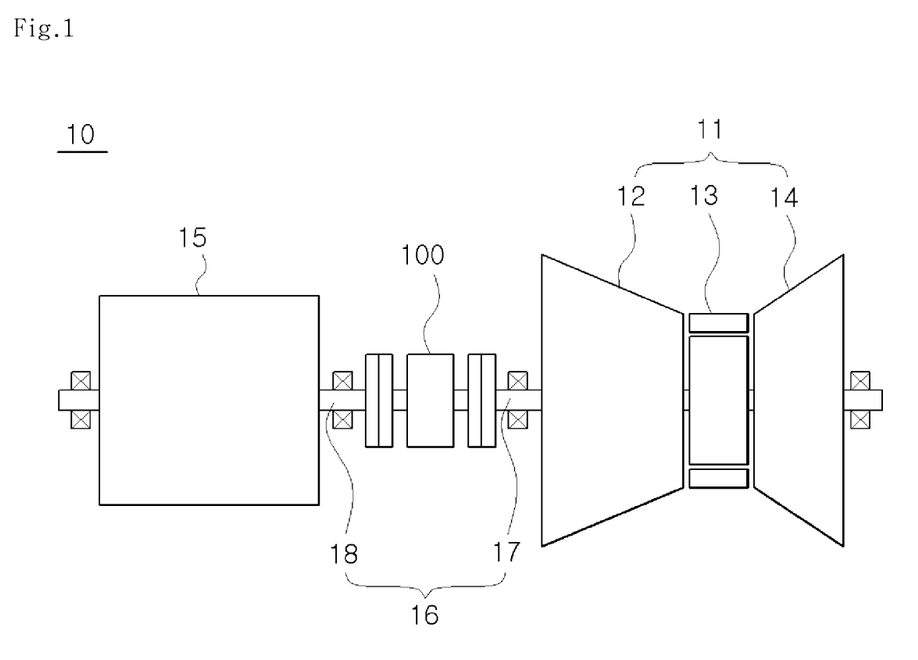
FIG. 1 is a view illustrating a power generation system including a gas turbine as a power generation apparatus according to an exemplary embodiment.
Figure 2:
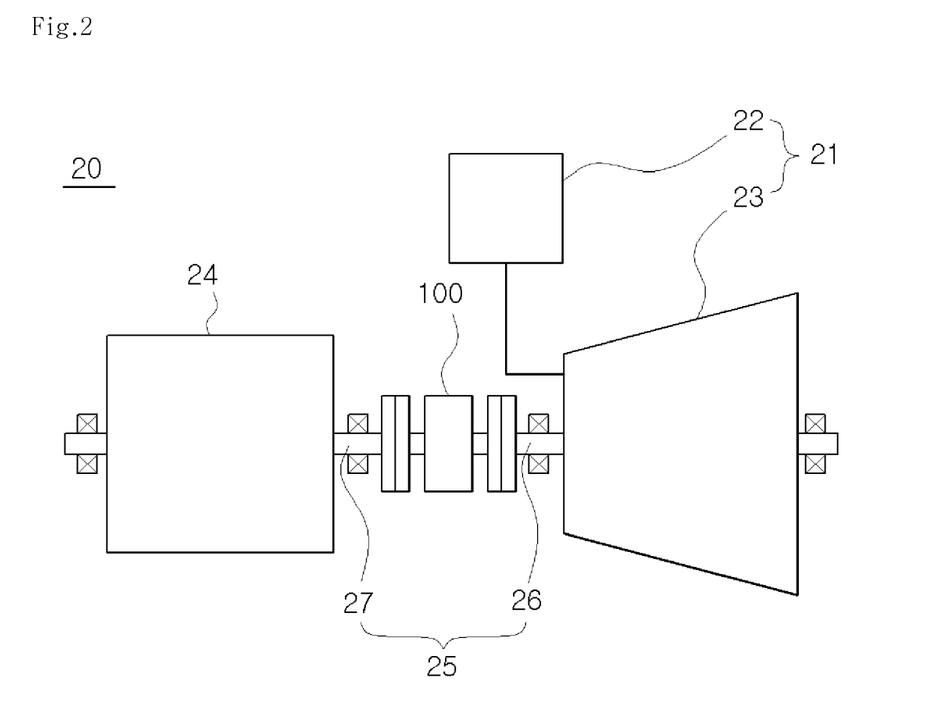
FIG. 2 is a view illustrating a power generation system including a steam turbine as a power generation apparatus according to an exemplary embodiment.

FIG. 1 is a view illustrating a power generation system including a gas turbine as a power generation apparatus according to an exemplary embodiment, and FIG. 2 is a view illustrating a power generation system including a steam turbine as a power generation apparatus according to an exemplary embodiment.

Referring to FIG. 1, a power generation system 10 according to an exemplary embodiment includes a gas turbine 11, a generator 15, and a power transmission apparatus 100. The gas turbine 11 includes a compressor 12 configured to compress air introduced from the outside, a combustor 13 configured to mix the compressed air supplied from the compressor 12 with fuel and combust the mixture, and a turbine 14 configured to generate power for generating electric power by the combustion gas supplied from the combustor 13. The generator 15 is installed on one side of the gas turbine 11 to generate electricity using the power generated from the gas turbine 11. The power transmission apparatus 100 is installed between the gas turbine 11 and the generator 15 to transmit the power generated from the gas turbine 11 to the generator 15.

The power generation system 10 further includes a shaft system 16. The shaft system 16 includes a gas turbine shaft 17 mounted through a center of the gas turbine 11 and a generator shaft 18 mounted through a center of the generator 15. The power transmission apparatus 100 is installed between the gas turbine shaft 17 and the generator shaft 18 to transmit the rotational driving force of the gas turbine shaft 17 generated while the gas turbine 11 is driven to the generator shaft 18. That is, the generator 15 generates power according to the principle of electromagnetic induction.

Referring to FIG. 2, a power generation system 20 according to an exemplary embodiment includes a steam turbine 21, a generator 24, and a power transmission apparatus 100. The steam turbine 21 includes a boiler 22 that receives water from the outside and evaporates water into steam, and a turbine 23 that generates power for driving the generator 24 by the steam supplied from the boiler 22. The generator 24 is installed on one side of the steam turbine 21 to generate electricity using the power generated from the steam turbine 21. The power transmission apparatus 100 is installed between the steam turbine 21 and the generator 24 to transmit the power generated from the steam turbine 21 to the generator 24.

The power generation system 20 further includes a shaft system 25. The shaft system 25 includes a steam turbine shaft 26 mounted through a center of the steam turbine 21, and a generator shaft 27 mounted through a center of the generator 24. The power transmission apparatus 100 is installed between the steam turbine shaft 26 and the generator shaft 27 to transmit the rotational driving force of the steam turbine shaft 26 generated while the steam turbine 21 is driven to the generator shaft 27. That is, the generator 24 generates power according to the principle of electromagnetic induction.

Figure 3:
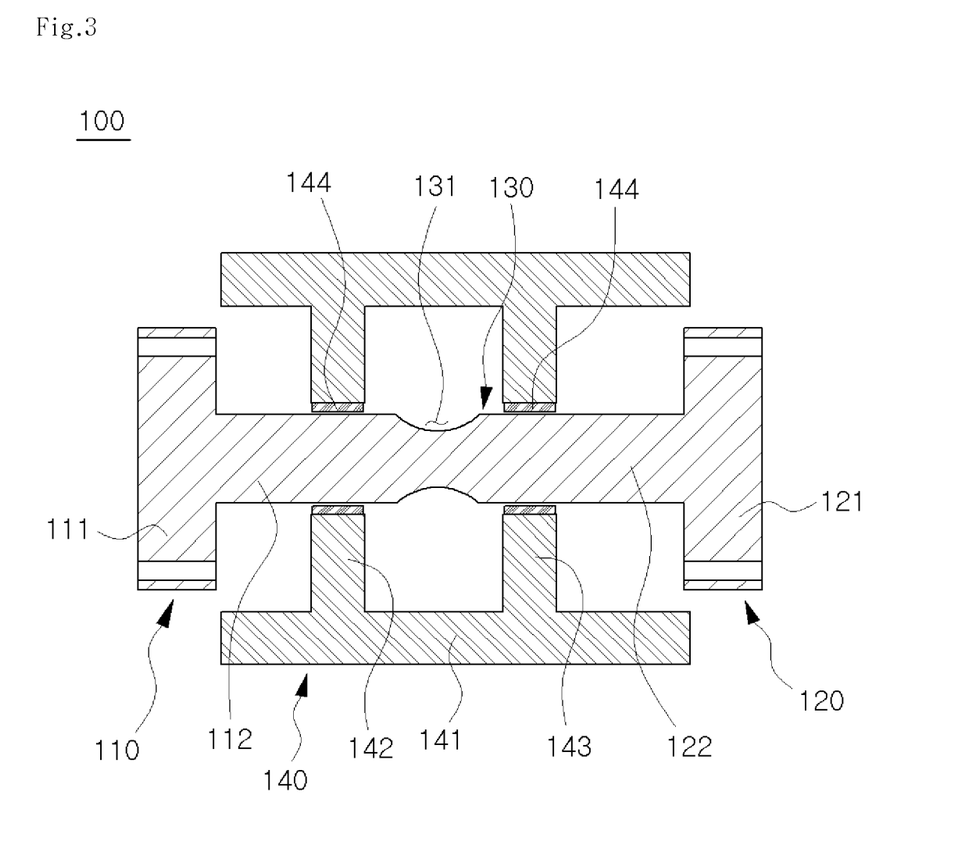
FIG. 3 is a view illustrating a first example of a power transmission apparatus according to an exemplary embodiment.
Figure 4:
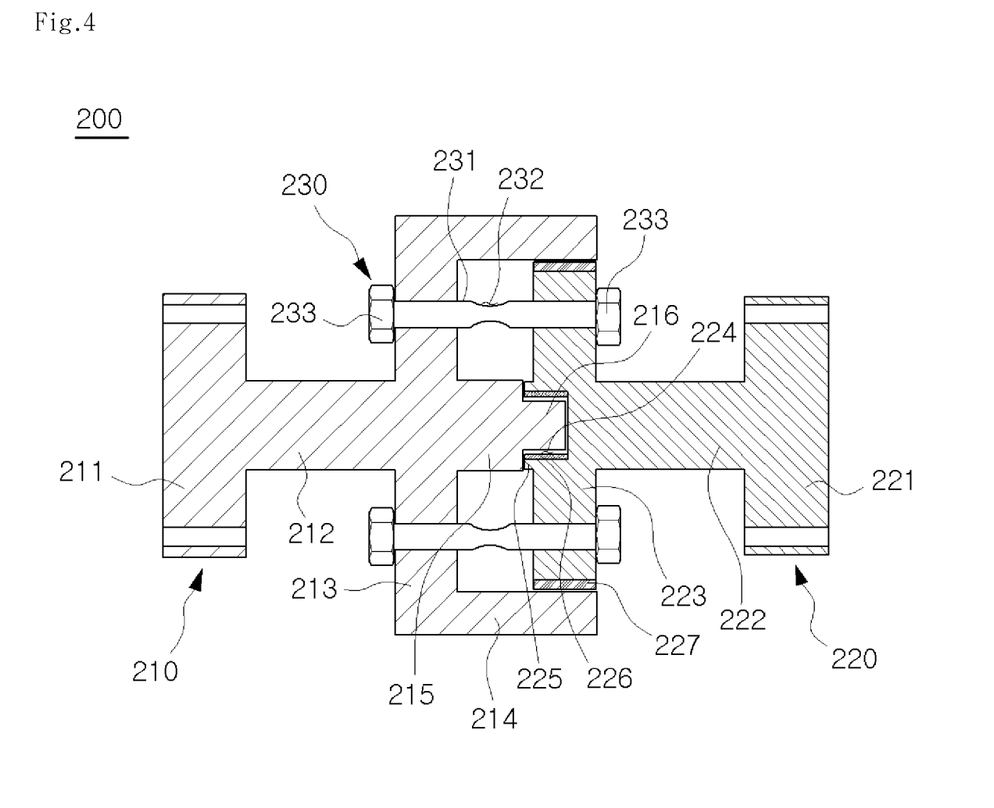
FIG. 4 is a view illustrating a second example of a power transmission apparatus according to an exemplary embodiment.
Figure 5:
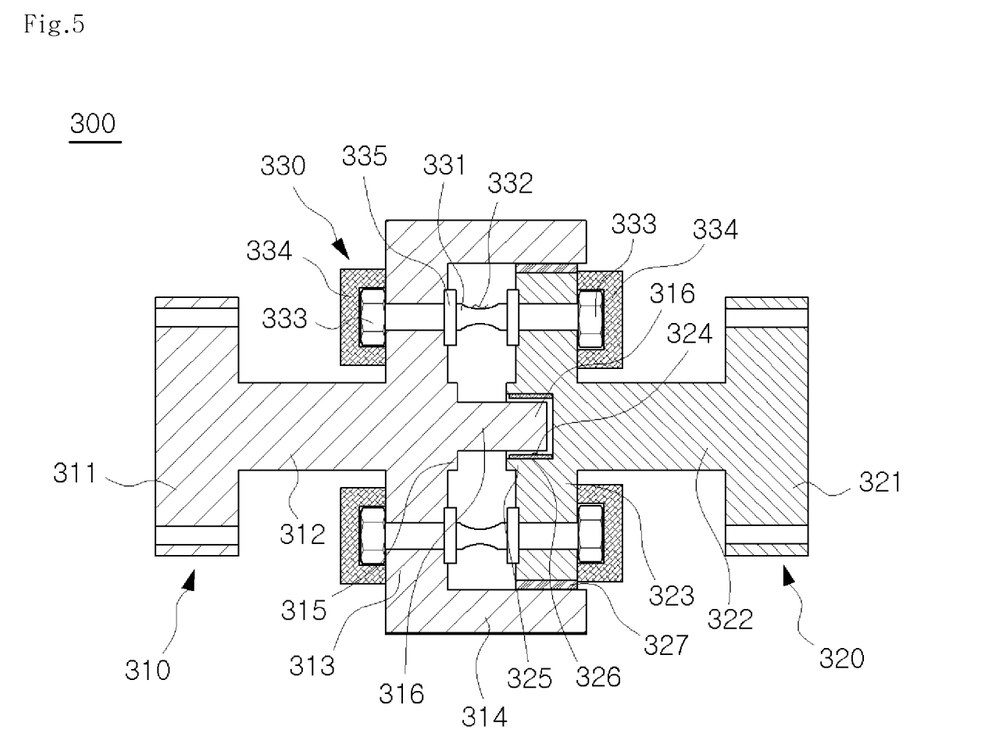
FIG. 5 is a view illustrating a third example of a power transmission apparatus according to an exemplary embodiment.

FIG. 3 is a view illustrating a first example of a power transmission apparatus according to an exemplary embodiment, FIG. 4 is a view illustrating a second example of a power transmission apparatus according to an exemplary embodiment, and FIG. 5 is a view illustrating a third example of a power transmission apparatus according to an exemplary embodiment.

Referring to FIG. 3, the power transmission apparatus 100 according to the first exemplary embodiment includes a first disk part 110, a second disk part 120, a connection part 130, and a support part 140.

The first disk part 110 is connected to any one of the power generation apparatus 11 and 21 and the generator 15 and 24. The second disk part 120 is connected to the other one of the power generation apparatus 11 and 21 and the generator 15 and 24. For example, when the first disk part 110 is connected to the gas turbine shaft 17 or the steam turbine shaft 26, the second disk part 120 is connected to the generator shaft 18 and 27. Alternatively, when the first disk part 110 is connected to the generator shaft 18 and 27, the second disk part 120 is connected to the gas turbine shaft 17 or the steam turbine shaft 26. Hereinafter, for convenience of explanation, it is assumed that the first disk part 110 is connected to the generator shaft 18 and 27, and the second disk part 120 is connected to the gas turbine shaft 17 or the steam turbine shaft 26.

The second disk part 120 is disposed on a rear side of the first disk part 110. The connection part 130 is disposed between the first disk part 110 and the second disk part 120 to connect the first disk part 110 and the second disk part 120. The first disk part 110 and the second disk part 120 are integrally coupled to each other by the connection part 130. The support part 140 is disposed on a radially outward of the first disk part 110 and the second disk part 120 to support the first disk part 110 and the second disk part 120.

The first disk part 110 includes a first coupling disk 111 and a first disk shaft 112. The first coupling disk 111 is coupled to the generator shaft 18 and 27. The second disk shaft 112 is coupled to the rear surface of the first coupling disk 111. The second disk part 120 includes a second coupling disk 121 and a second disk shaft 122. The second coupling disk 121 is coupled to the gas turbine shaft 17 or the steam turbine shaft 26. The second disk shaft 122 is coupled to the front surface of the second coupling disk 121. The connection part 130 is disposed between the first disk shaft 112 and the second disk shaft 122 and is integrally coupled to the first disk shaft 112 and the second disk shaft 122.

The connection part 130 is formed in a shape in which a diameter decreases and increases along a longitudinal direction (i.e., the front-rear direction in FIG. 3). For example, the connection part 130 has a recessed groove 131 formed on an outer circumferential surface thereof. The recessed groove 131 is formed in a recessed shape radially inward from the outer circumferential surface of the connection part 130. Therefore, the connection part 130 is formed such that the recessed groove 131 has a smaller diameter than other portions of the connection part 130. Meanwhile, the connection part 130 has the same diameter as the first and second disk shafts 112 and 122. Therefore, the recessed groove 131 of the connection part 130 has a diameter smaller than that of the first and second disk shafts 112 and 122 as well as other portions of the connection part 130.

According to the power transmission apparatus 100 and the power generation system 10 and 20 including the same, the generator 15 and 24 serves as a motor in an emergency situation such as a power system surge, so when excessive torque is applied to the first disk part 110, the recessed groove 131 of the connection part 130 is cut before other portions of the power transmission apparatus 100. Therefore, according to the exemplary embodiment, it is possible to prevent excessive torque applied to the first disk part 110 from being transmitted to the second disk part 120 in an emergency situation, and the shaft system 16 and 25 of the power generation system 10 and 20 can be prevented from being damaged.

Although FIG. 3 illustrates that an inner wall of the recessed groove 131 has a concave shape with a curvature, it is understood that this is merely an example, and the inner wall of the recessed groove 131 may be formed to have a shape with at least two linear portions defined at an angle.

The support part 140 is provided to support radially outer portions of the first disk part 110 and the second disk part 120, and includes a support body 141, a first support member 142, a second support member 143, and a backup bearing 144.

The support body 141 is radially spaced apart from the outer side of the first disk shaft 112 and the second disk shaft 122 such that the support body 141 is disposed parallel to the first disk shaft 112 and the second disk shaft 122. The first support member 142 extends radially inward from an inner circumferential surface of the support body 141 to support the first disk shaft 112. The second support member 143 extends radially inward from the inner circumferential surface of the support body 141 and is spaced apart from the rear side of the first support member 142 to support the second disk shaft 122.

The backup bearing 144 is provided as a pair such that one backup bearing is disposed between the first support member 142 and the first disk shaft 112 and the other backup bearing is disposed between the second support member 143 and the second disk shaft 122. The backup bearings 144 rotatably support the first disk shaft 112 and the second disk shaft 122 with respect to the first support member 142 and the second support member 143, respectively.

On the other hand, when the recessed groove 131 of the connection part 130 is damaged and fragments are generated, the support part 140 serves to prevent the fragments from scattering to the outside.

Referring to FIG. 4, a power transmission apparatus 200 according to the second exemplary embodiment includes a first disk part 210, a second disk part 220, and a connection part 230.

The first disk part 210 and the second disk part 220 are rotatably coupled to each other. The connection part 230 couples the first disk part 210 and the second disk part 220 to each other. Therefore, the first and second disk parts 210 and 220 rotate together if a recessed groove 232 of the connection part 230 is not damaged, while the first and second disk parts 210 and 220 rotate with respect to each other if the recessed groove 232 of the connection part 230 is damaged.

The first disk part 210 includes a first coupling disk 211, a first disk shaft 212, a first disk base 213, a first disk wall 214, a first disk support protrusion 215, and a first disk protrusion 216.

The first coupling disk 211 is coupled to the generator shaft 18 and 27. The first disk shaft 212 is coupled to a rear surface of the first coupling disk 211. The first disk base 213 is formed in a disk shape and is coupled to a rear end of the first disk shaft 212. The first disk wall 214 is formed to extend rearward from a radially outer end of the first disk base 213. The first disk support protrusion 215 is formed to protrude rearward from a center of the rear surface of the first disk base 213. The first disk protrusion 216 is formed to protrude rearward from a rear end of the first disk support protrusion 215 and has a smaller diameter than the first disk support protrusion 215.

The second disk part 220 is disposed on the rear side of the first disk part 210 and includes a second coupling disk 221, a second disk shaft 222, a second disk base 223, a second disk support protrusion 225, a second backup bearing 226, and a second backup bearing 227.

The second coupling disk 221 is coupled to the gas turbine shaft 17 or the steam turbine shaft 20. The second disk shaft 222 is formed to protrude forward from the center of the front surface of the second coupling disk 221. The second disk base 223 is coupled to a front end of the second disk shaft 222 and is disposed to face the first disk base 213. In addition, the second disk base 223 has a base groove 224 into which the first disk protrusion 216 is inserted at the center of a front surface thereof. The second disk support protrusion 225 is formed to protrude forward from the front surface of the first disk base 213, and the base groove 224 is formed in the radially inward portion thereof. Further, the second disk support protrusion 225 is disposed to face the first disk support protrusion 215. At this time, the first disk support protrusion 215 and the second disk support protrusion 225 are disposed to contact each other.

The first backup bearing 226 is seated in the base groove 224 to accommodate the first disk protrusion 216 therein to rotatably support the first disk protrusion 216. The second backup bearing 227 is interposed between the first disk wall 214 and the second disk base 223 to rotatably support the second disk base 223.

The first backup bearing 226 may be designed to have any one structure selected from a sleeve bearing, a rolling bearing, and a sliding bearing (also referred to as a plain bearing). Among them, the first backup bearing 226 may be designed in a bushing structure, which is a type of sleeve bearing, and can be slidably coupled with the first disk protrusion 216. Here, the sliding coupling means that the first disk protrusion 216 does not rotate with the first backup bearing 226 in the base groove 224, but only the first disk protrusion 216 rotates in the first backup bearing 226, and the first backup bearing 226 is fixed in the base groove 224.

The second backup bearing 227 may also be designed to have any one structure selected from a sleeve bearing, a rolling bearing, and a sliding bearing (also referred to as a plain bearing). Because the role of the second backup bearing 227 is similar to that of the first backup bearing 226, a detailed description will be omitted.

The connection part 230 is installed to connect the first disk part 210 and the second disk part 220 through the first disk base 213 and the second disk base 223. To this end, the connection part 230 includes a connection member 231 and a nut member 233.

The connection member 231 is a rod-shaped member whose diameter increases after passing through the first disk base 213 and the second disk base 223 in the longitudinal direction and decreasing along the longitudinal direction (e.g., front-rear direction in FIG. 4). For example, the connection member 231 has a recessed groove 232 formed in an outer circumferential surface between the first disk base 213 and the second disk base 223. The recessed groove 232 is formed in a recessed shape radially inward from the outer circumferential surface of the connection member 231. Accordingly, the recessed groove 232 of the connection member 231 has a smaller diameter than other portions of the connection member 231. Although FIG. 4 illustrates that the inner wall of the recessed groove 232 has a concave shape with a curvature, it is understood that this is merely an example, and the inner wall of the recessed groove 232 may be formed to have a shape with at least two linear portions defined at an angle.

The nut members 233 are provided in a pair such that two nut members are respectively coupled to both ends of the connection member 231 protruding forward from the first disk base 213 and projecting rearward from the second disk base 223, respectively. Further, the pair of nut members 233 are mounted on a front surface of the first disk base 213 and a rear surface of the second disk base 233, respectively.

As described above, according to the function of the power transmission apparatus 200 of the second exemplary embodiment, in a normal operation of the power generation system 10 and 20, the first disk part 210 and the second disk part 210 rotate together by the connection part 230. At this time, in an emergency situation such as a surge in the power system, the generator 15 and 24 serves as an electric motor, and excessive torque is applied to the first disk part 210. In this case, the recessed groove 232 of the connection part 230 is damaged, and the first disk part 210 and the second disk part 220 rotate with respect to each other.

According to the exemplary embodiment, in an emergency situation, when excessive torque is applied to one of the first disk part 210 and the second disk part 220, it is possible to prevent excessive torque from being transmitted to the other disk part. Accordingly, it is possible to protect the shaft system of the power generation system 10 and 20 even in an emergency situation such as a surge in the power system.

Referring to FIG. 5, a power transmission apparatus 300 according to the third exemplary embodiment includes a first disk part 310, a second disk part 320, and a connection part 330.

The first disk part 310 includes a first coupling disk 311, a first disk shaft 312, a first disk base 313, a first disk wall 314, a first disk support protrusion 315, and a first disk protrusion 316. The second disk part 320 is disposed on a rear side of the first disk part 310 and includes a second coupling disk 321, a second disk shaft 322, a second disk base 323, a second disk support protrusion 325, a first backup bearing 326, and a second backup bearing 327. The configuration of the first disk part 310 and the second disk part 320 in the third exemplary embodiment of FIG. 5 is the same as that of the first disk part 210 and the second disk part 220 in the second exemplary embodiment of FIG. 4, except for the arrangement of the first disk support protrusion 315 and the second disk support protrusion 325, so a detailed description will be omitted.

The connection part 330 is installed to pass connect the first disk part 310 and the second disk part 320 through the first disk base 313 and the second disk base 323. To this end, the connection part 330 includes a connection member 331, a nut member 333, a cover member 334, and a locking member 335.

The connection member 331 is a rod-shaped member whose diameter increases after passing through the first disk base 313 and the second disk base 323 in the longitudinal direction and decreasing along the longitudinal direction (e.g., front-rear direction in FIG. 5). For example, the connection member 331 has a recessed groove 332 formed in an outer circumferential surface between the first disk base 313 and the second disk base 323. The recessed groove 332 is formed in a recessed shape radially inward from the outer circumferential surface of the connection member 331. Accordingly, the recessed groove 332 of the connection member 331 has a smaller diameter than other portions of the connection member 331. Although FIG. 5 illustrates that the inner wall of the recessed groove 332 has a concave shape with a curvature, it is understood that this is merely an example, and the inner wall of the recessed groove 332 may be formed to have a shape with at least two linear portions defined at an angle.

The nut members 333 are provided in a pair such that two nut members are respectively coupled to both ends of the connection member 331 protruding forward from the first disk base 313 and projecting rearward from the second disk base 323, respectively. Further, the pair of nut members 333 are mounted on a front surface of the first disk base 313 and a rear surface of the second disk base 333, respectively.

The cover members 334 are provided in a pair to externally cover the pair of nut members 333. Therefore, if the recessed groove 332 of the connection member 331 is damaged, the cover member 334 prevents the connection member 331 from being detached from the first disk base 313 or the second disk base 323.

The locking member 335 is disposed between the first disk base 313 and the second disk base 323 and is coupled to the connection member 331. In addition, the locking members 335 are provided in a pair such that the locking members are spaced apart from each other in the longitudinal direction so that the recessed groove 332 is disposed therebetween. Further, the pair of locking members 335 are mounted on a rear surface of the first disk base 313 and a front surface of the second disk base 323, respectively. Accordingly, the locking members 335 prevent the connection member 331 from moving back and forth with respect to the first disk base 313 and the second disk base 323, and also prevent the connection member 331 from being detached from the first disk base 313 and the second disk base 323 if the recessed groove 332 of the connection part 331 is damaged.

The first disk support protrusion 315 is disposed to be spaced apart from the second disk support protrusion 325. For example, compared to the second exemplary embodiment, in the third exemplary embodiment, a gap is formed between the first disk support protrusion 315 and the second disk support protrusion 325. Here, the distance between the first disk support protrusion 315 and the second disk support protrusion 325 is larger than the width of the recessed groove 332 in the front-rear direction and smaller than the distance between the pair of locking members 335.

According to the third exemplary embodiment, in an emergency situation such as a surge in the power system, when excessive torque is applied to the first disk part 310, the recessed groove 332 of the connection member 331 is cut, thereby preventing excessive torque acting on the first disk part 310 from being transmitted to the second disk part 320, and thus preventing the shaft system 16 and 25 of the power generation system 10 and 20 from being damaged.

In addition, according to the third exemplary embodiment, the connection part 330 includes the cover member 334 and the locking members 335 to prevent the connection member 331 from moving in the front-rear direction, and if the recessed groove 332 of the connection member 331 is damaged, it prevents the connection member 331 from being detached from the first disk part 310 or the second disk part 320.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A power transmission apparatus for transmitting power generated by a power generation apparatus to a generator, the power transmission apparatus comprising:
    a first disk part connected to a shaft of the generator, the first disk part including a first coupling disk and a first disk shaft;
    a second disk part connected to a shaft of the power generation apparatus and disposed on a rear side of the first disk part, the second disk part including a second coupling disk and a second disk shaft; and
    a connection part configured to connect the first disk part and the second disk part and include a portion that decreases and then increases in diameter along a longitudinal direction,
    wherein the first disk shaft and the second disk shaft are disposed between the first coupling disk and the second coupling disk,
    wherein the first disk shaft is formed to protrude from a rotational center of the first coupling disk toward a rotational center of the second coupling disk and the second disk shaft is formed to protrude from the rotational center of the second coupling disk toward the rotational center of the first coupling disk.

2. The power transmission apparatus according to claim 1, wherein the connection part includes a recessed groove that is recessed radially inward from an outer circumferential surface.

3. The power transmission apparatus according to claim 1, wherein the connection part is disposed between the first disk shaft and the second disk shaft, connecting the first disk shaft and the second disk shaft.

4. The power transmission apparatus according to claim 3, further comprising:
    a support part supporting the first disk shaft and the second disk shaft from a radially outward of the first disk shaft and the second disk shaft.

5. The power transmission apparatus according to claim 4, wherein the support part includes:
    a support body disposed on a radially outward of the first and second disk shafts;
    a first support member extending radially inward from an inner circumferential surface of the support body to support the first disk shaft; and
    a second support member extending radially inward from the inner circumferential surface of the support body and disposed on a rear side of the first support member to support the second disk shaft.

6. The power transmission apparatus according to claim 5, wherein the support part is interposed between the first support member and the first disk shaft, and between the second support member and the second disk shaft, respectively, and further includes a backup bearing rotatably supporting the first disk shaft and the second disk shaft.

7. The power transmission apparatus according to claim 1, wherein the second disk part is rotatably installed with respect to the first disk part.

8. The power transmission apparatus according to claim 1, wherein the first disk part includes:
    a first disk base coupled to a rear side of the first disk shaft, the first disk base being spaced apart from the first coupling disk; and
    a first disk wall extending rearward from a radially outer end of the first disk base, the first disk wall being spaced apart from the first disk shaft,
    wherein the second disk part includes:
    a second disk base coupled to a front side of the second disk shaft and disposed to face the first disk base, the second disk base being spaced apart from the second coupling disk, and
    wherein the connection part is disposed to penetrate through the first disk base and the second disk base.

9. The power transmission apparatus according to claim 8, wherein the first disk part further includes a first disk protrusion protruding rearward from the first disk base,
    wherein the second disk base includes a base groove into which the first disk protrusion is inserted into the front side, and
    wherein the second disk part further includes a first backup bearing seated in the base groove and into which the first disk protrusion is inserted so that the first disk protrusion is rotatably supported.

10. The power transmission apparatus according to claim 8, wherein the second disk part further includes a second backup bearing interposed between the first disk wall and the second disk base to rotatably support the second disk base.

11. The power transmission apparatus according to claim 9, wherein the first disk part further includes a first disk support protrusion protruding rearward from the first disk base, wherein the first disk protrusion protrudes rearward from the first disk support protrusion and has a smaller diameter than the first disk support protrusion.

12. The power transmission apparatus according to claim 11, wherein the second disk part further includes a second disk support protrusion protruding forward from the second disk base and disposed to face the first disk support protrusion, wherein the base groove is formed on a radially inward of the second disk support protrusion.

13. The power transmission apparatus according to claim 8, wherein the connection part includes a connection member formed to penetrate through the first and second disk bases in a front-rear direction and having a portion whose diameter decreases and then increases along a longitudinal direction.

14. The power transmission apparatus according to claim 13, wherein the connection part further includes a pair of nut members coupled to both ends of the connection member protruding forward from the first disk base and rearward from the second disk base, respectively, and seated on a front surface of the first disk base and a rear surface of the second disk base, respectively.

15. The power transmission apparatus according to claim 12, wherein the second disk support protrusion is in contact with the first disk support protrusion.

16. The power transmission apparatus according to claim 14, wherein the connection part further includes a pair of cover members covering the pair of nut members from an outside of the pair of nut members.

17. The power transmission apparatus according to claim 13, wherein the connection member includes a recessed groove recessed radially inward from an outer circumferential surface thereof, and the connection part further includes a pair of locking members coupled to the connection member between the first disk base and the second disk base and spaced apart from each other in the front-rear direction so that the recessed groove is disposed therebetween, wherein the pair of locking members are seated on a rear surface of the first disk base and a front surface of the second disk base, respectively.

18. The power transmission apparatus according to claim 12, wherein the connection part includes a connection member formed to penetrate through the first and second disk bases in a front-rear direction and having a portion whose diameter decreases and then increases along a longitudinal direction, and the connection member includes a recessed groove recessed radially inward from an outer circumferential surface thereof, wherein a distance between the first disk support protrusion and the second disk support protrusion is greater than a width of the recessed groove in the front-rear direction.

* * * * *